US012591645B2

(12) United States Patent
Pellen et al.

(10) Patent No.: US 12,591,645 B2
(45) Date of Patent: Mar. 31, 2026

(54) CHARACTERIZATION OF A USER VIA ASSOCIATION OF A SOUND WITH AN INTERACTIVE ELEMENT

(71) Applicant: ORANGE, Issy-les-Moulineaux (FR)

(72) Inventors: Nicolas Pellen, Chatillon (FR); Christian Gregoire, Chatillon (FR); Katell Peron, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 138 days.

(21) Appl. No.: 18/557,749

(22) PCT Filed: Apr. 28, 2022

(86) PCT No.: PCT/FR2022/050811
§ 371 (c)(1),
(2) Date: Oct. 27, 2023

(87) PCT Pub. No.: WO2022/229563
PCT Pub. Date: Nov. 3, 2022

(65) Prior Publication Data
US 2024/0202296 A1 Jun. 20, 2024

(30) Foreign Application Priority Data
Apr. 29, 2021 (FR) ...................................... 2104517

(51) Int. Cl.
*G06F 21/31* (2013.01)

(52) U.S. Cl.
CPC ...... *G06F 21/31* (2013.01); *G06F 2221/2133* (2013.01)

(58) Field of Classification Search
CPC ... G06F 21/31; G06F 2221/2133; G06F 21/36
See application file for complete search history.

(56) References Cited

U.S. PATENT DOCUMENTS 6,223,292 B1 * 4/2001 Dean ................ H04N 21/47202
726/28
7,555,539 B1 * 6/2009 Rosenberg ............. H04H 60/46
707/999.102

(Continued)

FOREIGN PATENT DOCUMENTS

WO 2008091675 A1 7/2008

OTHER PUBLICATIONS

English translation of the Written Opinion of the International Searching Authority dated Aug. 12, 2022 for corresponding International Application No. PCT/FR2022/050811, filed Apr. 28, 2022.

(Continued)

*Primary Examiner* — Aravind K Moorthy
(74) *Attorney, Agent, or Firm* — David D. Brush; Westman, Champlin & Koehler, P.A.

(57) ABSTRACT

A method for characterizing a user and a corresponding computer program, storage medium, and processing device. The method includes comparing between at least one first identifier of a first sound and at least one second identifier received from a human-machine interface, after the human-machine interface plays a plurality of second sounds, which are heard by the user. If the at least one second identifier received corresponds to the first identifier, the comparison triggers a characterization of the user as being a suitable user.

17 Claims, 5 Drawing Sheets

(56) References Cited

U.S. PATENT DOCUMENTS

| | | | | |
|---|---|---|---|---|
| 8,036,902 B1 * | 10/2011 | Strom | G06F 21/31 | 704/275 |
| 8,151,343 B1 * | 4/2012 | Wang | G06F 21/31 | 705/72 |
| 8,590,020 B1 * | 11/2013 | Orlovskaya | H04L 9/3228 | 726/28 |
| 9,026,914 B1 * | 5/2015 | Kauffmann | H04S 7/304 | 704/275 |
| 9,219,720 B1 * | 12/2015 | Satpathy | G06F 21/46 | |
| 9,330,198 B1 * | 5/2016 | Campbell | G06F 40/174 | |
| 10,158,646 B1 * | 12/2018 | Desai | H04L 63/102 | |
| 10,251,014 B1 * | 4/2019 | Lyren | H04S 3/008 | |
| 10,587,594 B1 * | 3/2020 | McClintock | H04L 63/08 | |
| 10,798,241 B1 * | 10/2020 | Quilici | H04M 3/436 | |
| 10,860,647 B2 * | 12/2020 | Scott | G06F 16/7834 | |
| 10,991,373 B1 * | 4/2021 | Wang | G06F 21/52 | |
| 11,140,171 B1 * | 10/2021 | Friedman | H04L 9/0861 | |
| 11,153,307 B1 * | 10/2021 | Davey | H04L 63/0853 | |
| 11,544,370 B1 * | 1/2023 | Pickering | G06F 21/6245 | |
| 2003/0210127 A1 * | 11/2003 | Anderson | G06F 21/36 | 340/5.27 |
| 2004/0196963 A1 * | 10/2004 | Appelman | H04M 3/02 | 379/88.12 |
| 2005/0050090 A1 * | 3/2005 | Kawahata | H04L 63/08 | |
| 2005/0065976 A1 * | 3/2005 | Holm | G11B 27/28 | |
| 2005/0166065 A1 * | 7/2005 | Eytchison | H04L 63/102 | 713/189 |
| 2006/0230464 A1 * | 10/2006 | Robbins | G06F 21/82 | 726/28 |
| 2007/0006302 A1 * | 1/2007 | Donnelly | G06F 21/31 | 726/22 |
| 2007/0166687 A1 * | 7/2007 | Bell | H04N 21/47 | 434/350 |
| 2008/0028205 A1 * | 1/2008 | Yang | G06F 21/36 | 713/156 |
| 2008/0222710 A1 * | 9/2008 | Blagsvedt | G06F 3/0485 | 726/19 |
| 2009/0204819 A1 * | 8/2009 | Parker | G06F 21/36 | 713/182 |
| 2010/0049526 A1 * | 2/2010 | Lewis | G10L 15/26 | 704/E21.001 |
| 2010/0095350 A1 * | 4/2010 | Lazar | G06F 21/36 | 726/3 |
| 2011/0032109 A1 * | 2/2011 | Fox | H04N 21/2407 | 340/628 |
| 2011/0154444 A1 * | 6/2011 | Sriraghavan | G06F 21/36 | 345/157 |
| 2011/0173273 A1 * | 7/2011 | Krachtus | H04L 63/1483 | 709/206 |
| 2012/0084450 A1 | 4/2012 | Nagamati et al. | | |
| 2013/0031641 A1 * | 1/2013 | Fisk | G06F 21/31 | 726/28 |
| 2013/0042303 A1 | 2/2013 | Chow et al. | | |
| 2013/0216027 A1 * | 8/2013 | Rados | H04M 3/51 | 379/32.01 |
| 2013/0218566 A1 * | 8/2013 | Qian | G10L 13/033 | 704/E11.001 |
| 2014/0020087 A1 * | 1/2014 | Ooi | G06F 21/36 | 726/19 |
| 2014/0067405 A1 * | 3/2014 | Patel | G10L 19/00 | 704/500 |
| 2014/0101739 A1 * | 4/2014 | Li | G06F 21/31 | 726/7 |
| 2014/0163986 A1 * | 6/2014 | Lee | G10L 17/00 | 704/248 |
| 2014/0196133 A1 * | 7/2014 | Shuster | G06F 21/31 | 726/7 |
| 2014/0310764 A1 * | 10/2014 | Tippett | G06F 21/31 | 726/1 |
| 2015/0205457 A1 * | 7/2015 | Woo | G06F 3/0482 | 715/767 |
| 2015/0256895 A1 * | 9/2015 | Young | G06F 3/04886 | 725/37 |
| 2015/0294096 A1 * | 10/2015 | Grigg | H04L 63/08 | 726/5 |
| 2015/0319153 A1 | 11/2015 | Tartz et al. | | |
| 2015/0365401 A1 * | 12/2015 | Brown | G06F 21/31 | 726/7 |
| 2016/0373891 A1 * | 12/2016 | Ramer | H04W 4/024 | |
| 2017/0068805 A1 * | 3/2017 | Chandrasekharan | G10L 21/003 | |
| 2017/0091431 A1 * | 3/2017 | Jakobsson | G06F 1/163 | |
| 2017/0149958 A1 * | 5/2017 | Xian | H04M 1/6058 | |
| 2018/0082052 A1 * | 3/2018 | Swart | G06F 21/32 | |
| 2018/0233152 A1 * | 8/2018 | Olaya | G10L 15/22 | |
| 2018/0349579 A1 * | 12/2018 | Allouche | G06F 21/31 | |
| 2019/0217198 A1 * | 7/2019 | Clark | H04S 7/303 | |
| 2020/0026830 A1 * | 1/2020 | Alameh | H04L 63/105 | |
| 2020/0042678 A1 * | 2/2020 | Vargas | G06F 21/31 | |
| 2020/0104053 A1 * | 4/2020 | Peng | G06F 3/162 | |
| 2020/0110818 A1 * | 4/2020 | Garcia Guirado | G06F 16/258 | |
| 2020/0186489 A1 * | 6/2020 | Chen | G06F 21/31 | |
| 2020/0210974 A1 * | 7/2020 | Dermosessian | G06Q 20/10 | |
| 2020/0228604 A1 * | 7/2020 | Wang | G06F 21/6245 | |
| 2020/0286086 A1 * | 9/2020 | Chanduri | G06Q 20/3827 | |
| 2020/0342076 A1 * | 10/2020 | Alameh | G06F 21/35 | |
| 2021/0076154 A1 * | 3/2021 | Lyren | H04S 3/008 | |
| 2021/0158051 A1 * | 5/2021 | Dalal | G06T 7/246 | |
| 2021/0158086 A1 * | 5/2021 | Salamon | G10L 25/51 | |
| 2021/0165628 A1 * | 6/2021 | Boerum | G06F 3/165 | |
| 2021/0243314 A1 * | 8/2021 | Munetomo | G06F 3/04817 | |
| 2021/0312943 A1 * | 10/2021 | Kulkarni | G06F 18/241 | |
| 2022/0035898 A1 * | 2/2022 | Thibeault | G10K 15/12 | |
| 2023/0385433 A1 * | 11/2023 | Weens | G06F 21/62 | |

OTHER PUBLICATIONS

International Search Report dated Aug. 12, 2022 for corresponding International Application No. PCT/FR2022/050811, filed Apr. 28, 2022.

Written Opinion of the International Searching Authority dated Aug. 12, 2022 for corresponding International Application No. PCT/FR2022/050811, filed Apr. 28, 2022.

Chithra P L et al., "Scanning-to-speech challenge-response authentication test for visually impaired", Mar. 30, 2021 (Mar. 30, 2021), vol. 92, XP086603910.

* cited by examiner

CHARACTERIZATION OF A USER VIA ASSOCIATION OF A SOUND WITH AN INTERACTIVE ELEMENT

CROSS-REFERENCE TO RELATED APPLICATIONS

This Application is a Section 371 National Stage Application of International Application No. PCT/FR2022/050811, filed Apr. 28, 2022, which is incorporated by reference in its entirety and published as WO 2022/229563 A1 on Nov. 3, 2022, not in English.

TECHNICAL FIELD

This disclosure falls within the field of computer security.

More particularly, this disclosure relates to a method for differentiating between a human and a machine, and to a corresponding computer program and storage medium.

PRIOR ART

A CAPTCHA (Completely Automated Public Turing-test to tell Computers and Humans Apart) is a test intended to differentiate between a user and a computer program. It is used in forms in particular, to protect against spam, i.e. unsolicited electronic communications.

There are different types of CAPTCHAs, the most numerous being visual CAPTCHAs where the user is asked to enter a series of distorted letters displayed on the screen.

Accentuated deformation is essential in terms of computer security. Indeed, as image recognition is very widespread, it is increasingly easy for a computer robot to circumvent this type of security protection.

A disadvantage of such accentuated deformation is that CAPTCHAs often pose difficulties for even the most experienced users. In fact, it is often necessary to make several attempts before correctly responding to a CAPTCHA.

For some users, the presence of a CAPTCHA is quite simply unacceptable. For example, a blind user cannot complete a visual CAPTCHA. These verification systems fail to recognize certain users with disabilities as human, and therefore make it impossible for these users to create accounts, write comments, or make purchases on certain sites.

Some sites offer an audio CAPTCHA as an alternative for users who wish it, where a voice recites a series of numbers to be transcribed into the user's assumed language.

However, the audio description is conditional on the user's language and level of understanding of the language used, even native in cases of illiteracy. Audio description thus remains a barrier to accessibility for a certain number of users.

There is therefore a need for a new method of human-machine differentiation that overcomes language barriers, for the purposes of increased accessibility.

SUMMARY

This disclosure improves the situation.

A method for characterizing a user is proposed, the method being implemented by a processing device, the method comprising:

a comparison between at least one first identifier of a first sound and at least one second identifier received from a human-machine interface, the second identifier being received after the human-machine interface plays a plurality of second sounds, the comparison triggering, if the second identifier received corresponds to the first identifier, a characterization of the user as being a suitable user.

The term "processing device" is understood to mean any device capable of carrying out computer processing according to the proposed method. For example, it may be a terminal for use by a user, such as a television, a computer, or a multifunction telephone, or a network device, in particular a home gateway, a set-top box, or any form of device for providing digital services and/or digital content, accessible for example via a local area network and/or a wide area network.

For example, several first sounds can be defined, such as a drum roll, a kettle whistle, thunder, etc. and each of these first sounds can be associated with one or more first identifiers. Thus, for each of these first sounds, a first corresponding subset is obtained that is composed of one or more first identifiers. The first sound corresponding to a drum roll can thus be associated with various identifiers, for example such as the word "drum", the expression "drum roll", various possibly animated images of drums, etc.

The second sound, heard by the user, is considered as corresponding to one of the first sounds. For example, the second sound may comprise a drum roll identical or similar to one that is one of the examples of first sounds defined above. The user then interacts with the human-machine interface so as to associate at least one second identifier with the second sound.

The method thus makes it possible, by means of the comparison between at least one second identifier and a first identifier, to determine whether the user's identification of the second sound heard is in accordance with the expected identification. If successful, this allows certifying that the user was able to identify the second sound correctly and to finish up by characterizing the user as a suitable user. Conversely, this also makes it possible to characterize a user who has failed to correctly identify the second sound as being an unsuitable user, or at least not to characterize them as being a suitable user.

In a first particular embodiment, the user will identify one of the second sounds heard prior to a question relating to one of these second sounds heard, for example, after having played five animal calls, the following question is asked of the user: "What animal is heard third in the list of calls?" and the second identifier provided/selected by the user for the second sound heard in the third position in the list of second sounds played will be compared to the first identifier stored in association with a first sound corresponding to the second sound heard in the third position in the list of second sounds played.

In a second particular embodiment, the user will identify one of the second sounds heard prior to a question relating to one of these second sounds heard, for example, after having successively played five second sounds (each sound possibly being associated with a graphical element such as a tile in a grid), the user is asked the following question: "In what position did you hear or which tile corresponds to the animal call?" and the second identifier provided/selected by the user for the second sound heard will be compared to the first identifier, namely in this case the position/identifier of the tile, associated with a first sound associated with the second sound heard corresponding to the animal call in the list of second sounds played.

In a third particular embodiment, the user will identify each of the second sounds heard in the order that these second sounds heard were played, and each of the second identifiers provided/selected by the user for each second sound heard will be compared to a first identifier stored in association with a first sound corresponding to each second sound heard in the list of second sounds played.

A sound CAPTCHA according to the invention is a sound "memory" since the user must memorize each sound heard, in order, so as to then identify one or more sounds according to the order played which is also the order heard.

The expression "suitable user" can designate for example a human capable of correctly identifying the second sound as opposed to a machine which has no such capacity. Alternatively, the expression "suitable user" can designate a user equipped with specific hardware, such as an audio output capable of playing the second sound so that it can be heard by the user, or such as an audio input capable of capturing the second sound when it is heard by the user, as opposed to a user not equipped with such hardware.

A first example variant of the above method is proposed. In this first example variant, the method comprises:

a command to play a sound clip, a command to display a set of thumbnails, the displayed set of thumbnails comprising a first subset formed of at least one thumbnail, the first subset being associated with the played sound clip, reception of at least one selection signal coming from a human-machine interface, a signal being indicative of selection of a thumbnail in the displayed set of thumbnails, on the basis of the at least one selection signal received, identification of a second subset formed of each selected thumbnail, a comparison test between the first subset and the second subset, and based on the test result, identification of a user as being human or a machine.

A second example variant of the above method is also proposed, wherein the method comprises:

a command to display a set of play buttons, a button being respectively associated with a sound clip, for each displayed button, upon reception of an interaction signal coming from a human-machine interface, indicative of an interaction with said button, a command to play the sound clip associated with said button, for each button, after playing the sound clip associated with said button:

a command to display a visual entity descriptive of a subset of sound clips that is composed of at least one sound clip among the played sound clips, a command to display a set of thumbnails, a thumbnail respectively appearing superimposed on a play button, the displayed set of thumbnails comprising a first subset of thumbnails formed of at least one thumbnail, the first subset of thumbnails being superimposed on a subset of buttons that is associated with said subset of sound clips, reception of at least one selection signal from a human-machine interface, a signal being indicative of selection of a thumbnail in the displayed set of thumbnails, on the basis of the at least one signal received, identification of a second subset composed of each selected thumbnail, a comparison test between the first subset and the second subset, and based on the test result, identification of a user as being human or a machine.

Thus, in the first example variant of the method, the user makes an association between a sound, meaning the sound clip played, and at least one image, meaning at least one of the displayed thumbnails, by interacting with that thumbnail or those thumbnails.

In the second example variant of the method, the general principle is the same. The user makes an association between an image, the one displayed, and at least one sound, meaning at least one of the sound clips played, by interacting with at least one of the thumbnails displayed.

In the two example variants of the method, the comparison test allows verifying that the association made by the user corresponds to an expected association that is characteristic of an association a human would make. If so, then the user can be identified as a human, otherwise the user is identified as a machine.

To the extent that such a sound-image association is not linked to a particular language and does not require specific cultural knowledge, due to the nature of the sound clip(s) played, such as noises or sound effects, and of the image or thumbnails displayed, the above two variants of the proposed method both allow differentiating a human from a machine while eliminating language and cultural barriers, thus allowing better accessibility than known human-machine differentiation methods.

Furthermore, since sound recognition algorithms are currently less advanced than image recognition algorithms, this human-machine differentiation method is also more difficult for a malicious party to circumvent. Computer security is therefore increased.

The nature of the first and second identifiers is not restricted to an image or a thumbnail, however.

Each first identifier and each second identifier can for example have an identifier type among the following:

at least one word, i.e. a word, an expression, a definition, a short text, etc., at least one image, i.e. a photograph, a drawing, an animated image, a video, etc., a label associated with an object, such as a barcode, a QR code, an NFC tag, etc., allowing the user to select the second identifier in a real or virtual environment, a thumbnail.

In general, the user thus makes an association between the second sound and a second identifier of any type (in particular an image, text, or label) via a human-machine interface. This second identifier is then compared with a subset of first identifiers for the purposes of characterizing the user as suitable or not.

A computer program is also proposed, comprising instructions for implementing the above method when this program is executed by a processor.

A non-transitory computer-readable storage medium is also proposed, on which the above program is stored.

Such a storage medium can be any entity or device capable of storing the program. For example, the medium may include a means of storage such as ROM, for example a CD ROM or a microelectronic circuit ROM, or a magnetic storage means such as a USB key or a hard disk for example.

On the other hand, such a storage medium can be a transmissible medium such as an electrical or optical signal, which can be conveyed via an electrical or optical cable, by radio, or by other means, so that the computer program it contains can be executed remotely. The program according to the invention can in particular be downloaded over a network, for example the Internet.

Alternatively, the storage medium can be an integrated circuit into which the program is incorporated, the circuit being adapted to execute or to be used in the execution of the aforementioned method.

A processing device able to perform processing to characterize a user at the command of a human-machine interface is also proposed, wherein the processing device comprises:

a comparator able to compare at least one first identifier of a first sound and at least one second identifier received from a human-machine interface, the second identifier being received after the human-machine interface plays a plurality of second sounds, the comparator triggering, if the second identifier received corresponds to the first identifier, a characterizer capable of characterizing the user as being a suitable user.

The above method may optionally comprise certain additional functions as defined below.

For example, the method may comprise reception of at least one signal originating from a human-machine interface, the signal comprising the second identifier of the second sound heard.

The signal may be a voice recording of the user, reading or naming a second identifier in text form.

The signal can result from touch interaction by the user with a button on a screen, this button representing the second identifier in the form of text or an image.

The signal can be the result of analysis of an acquired image displaying the second identifier in the form of a label associated with an object, this label being real, for example a QR code, or virtual, such as a tooltip in augmented reality.

For example, the method may comprise a command to play a sound clip comprising a first sound associated with one of the first subsets of first identifiers of first sounds, the second sound heard comprising the first sound played.

In this example, the comparison between the first subset of first identifiers of the first sound and the second identifier received from the human-machine interface is intended to evaluate whether a user has heard and correctly identified the already-known first sound.

For example, the method may comprise a command to capture the second sound heard, the capture triggering a comparison of the second sound heard with at least one first sound associated with a first subset of identifiers.

In this example, the comparison between the first subset of first identifiers of the first sound and the second identifier received from the human-machine interface is intended to evaluate whether the potentially unknown second sound has a match with a known first sound within a database of first sounds.

For example, the method may comprise a command to display a set of thumbnails, the displayed set of thumbnails comprising at least one identifier of a first subset associated with the second sound heard. This is the case in particular in the first variation above.

For example, the method may comprise:

on the basis of at least one selection signal received comprising at least one second identifier received from a human-machine interface, upon the user of the human-machine interface hearing a second sound, a generation of a second subset comprising the second identifiers, the comparison being made between at least one first subset of first identifiers of a first sound and at least one second identifier of the second subset, the comparison triggering, if at least one second identifier or all the second identifiers of the second subset received belong to the first subset associated with a first sound corresponding to the second sound heard, the characterization of the user as being a suitable user.

For example, the user can thus provide a body of information identifying the second sound heard, this being compared to a body of reference information identifying a first known sound similar to the second sound heard.

The comparison may comprise a determination of a resemblance metric, for example 100% resemblance if the second identifiers of the second subset are strictly identical to the first identifiers of the first subset, and 0% resemblance if none of the second identifiers of the second subset are also found in the first subset and vice versa. This resemblance metric can for example be compared to a threshold beyond which the user is characterized as being a suitable user. This allows the user some leeway in the determination of second identifiers, instead of simply deeming the user as unsuitable if the user's identification of the second sound differs slightly from the expected identification.

For example, the method may comprise a selection of said at least one first subset of first identifiers in a database of first identifiers, on the basis of a lookup table associating a respective class with each first identifier in the database.

It may be provided for example that each subset of first identifiers belongs to a different class. Several subsets of first identifiers can thus be selected, each associated with a corresponding first sound, the first sounds in question being of different types (ringing, buzzing, whistling, etc.), or being associated with different themes (vehicle, everyday object, animal, ambient noise, etc.). The concept of sound classes is also described below through various examples, a class of first identifiers being able to be associated with such a sound class.

For example, it may be provided that the selection of said at least one first subset of first identifiers in the database of first identifiers is further based on the class associated with the sound clip selected as the second sound.

This makes it possible, for example, to ensure that the at least one second identifier which is expected to be associated with the second sound resembles only one of the subsets of first identifiers selected. This strengthens the robustness in determining whether or not the user is a suitable user.

For example, when the second sound is a sound produced by a given element, it may be provided that each first identifier of the first subset of first identifiers associated with the first sound corresponding to the second sound represents the given element.

Many types of given elements are conceivable as possible sources of the second sound.

Thus, the second sound may for example be an animal call, or an operating noise of a device, or a noise resulting from a meteorological event.

Such sound clips present the shared advantage of having a source that is easily representable in visual form, in a manner that is unambiguous to a human being.

Thus, for example, the second sound being an animal call, it may be provided that each identifier of a first subset of first identifiers is associated with the corresponding animal.

Alternatively, the second sound being an operating noise of a device, it may be provided that each identifier of a first subset of first identifiers is associated with the corresponding device.

Alternatively, when the second sound is a noise resulting from a meteorological event, it may be provided that each identifier of a first subset of first identifiers is associated with the corresponding meteorological event.

For example, the method may comprise a selection of the second sound in a database of sound clips on the basis of a lookup table associating a respective class with each sound clip in the database.

Sound classes may be defined for example by grouping sounds having a source of the same type, for example the sound of rain and the sound of wind can be grouped as sounds coming from nature, while a meow and a bark can be grouped together as pet calls. The formation of such classes of sounds or noises or sound effects is known to those skilled in the art.

Alternatively, sound classes may be defined by grouping sounds that present similarities, for example in terms of frequency spectrum.

For example, the above first variation of the method may comprise a selection of the set of thumbnails in a thumbnail database on the basis of a lookup table which associates a respective class with each thumbnail in the database.

By transposing this principle to the second variation of the method, it may similarly comprise a selection of the image in an image database on the basis of a lookup table associating a respective class with each image in the database.

Classes of images or thumbnails can be defined so that a class corresponds to a same represented entity, or an entity of the same type. For example, a class of images can be formed of images representing an animal, and a subclass of this class of images can be formed solely of images representing a horse. The formation of such classes of images or thumbnails is known to those skilled in the art.

The selection of the set of thumbnails in a thumbnail database, or of the image in an image database, can also be carried out on the basis of the class associated with at least one selected sound clip.

Referring for example to the first variation of the method, it is possible to select a sound clip belonging to a given class, for example a vacuum cleaner noise belonging to a class of noises made by household appliances. One or more thumbnails representing a vacuum cleaner can be selected on this basis and the other thumbnails in the set of thumbnails must be selected from thumbnail classes other than the one representing household appliances.

This makes it possible to form the set of thumbnails by selecting from different thumbnail classes, and thus ensure that no thumbnail represents an entity similar to the one to be identified.

In this manner, ambiguities are avoided that could cause a human to associate a thumbnail with a played sound clip which, although objectively legitimate, turns out to be different from the expected association. The relevance of the method for differentiating a human from a machine is thus reinforced.

For example, in the first variation of the method, the set of thumbnails may further comprise a third subset formed of at least one thumbnail, and said method can comprise:

a comparison test between the third subset and the second subset, and on the basis of this test, an updating, in the lookup table associating a respective class with each sound clip in the sound clip database, of the class associated with the selected sound clip, or an updating, in the lookup table associating a respective class with each thumbnail in the thumbnail database, of the class associated with at least one thumbnail in the third subset.

The third subset may for example be formed of one or more thumbnails of the same class as that of the first subset. Generally speaking, the third subset can represent an entity capable of emitting a noise similar to that emitted by the entity represented by the thumbnail(s) of the first subset.

For example, the first subset can represent a kettle, the third subset can represent a roof window in the rain. The whistling of the kettle and the striking of rain on the roof window have similarities. In this manner, by playing a sound clip where it is not certain whether it corresponds to the whistling of a kettle or the striking of rain on the roof window, it is possible to rely on the association made by the user between this sound clip and the presented thumbnails in order to be able to characterize this sound clip.

This principle can be applied in an analogous manner in the second variation of the method, by displaying an image and selecting different sound clips on the basis of this image, so as to have a first group and a second group of disjoint sound clips, each having a reasonable probability of corresponding to noises made by the entity depicted in the image, as well as a third group of sound clips clearly unrelated to the entity depicted in the image. The user can thus associate the first group or the second group of sound clips with the displayed image and therefore be identified as human while at the same time offering the possibility of characterizing the group of sound clips associated with the displayed image.

BRIEF DESCRIPTION OF THE DRAWINGS

Other features, details and advantages will become apparent upon reading the detailed description below, and upon analyzing the appended drawings, in which.

DESCRIPTION OF EMBODIMENTS

The drawings and the following description for the most part contain elements that are certain in nature. Therefore not only can they be used to provide a better understanding of this disclosure, but where appropriate they also contribute to its definition.

The general principle of the invention is based on identification of a sound heard by a user. This identification made by the user is then compared to an expected result. Specifically:

the expected result takes the form of a first subset of first identifiers of a "first sound" corresponding to the sound heard, the sound heard being designated below as a "second sound", and the identification made by the user when hearing the second sound takes the form of at least one second identifier received from a human-machine interface.

Based on the comparison between the first subset of first identifiers and the second identifier, the user is characterized as being a suitable user only if the at least one second identifier received belongs to the first subset. Otherwise, the user is characterized as an unsuitable user.

The invention finds numerous applications, particularly in the field of access control for digital services, and spam prevention.

For example, when receiving a message to be published, the invention can be used to characterize the author of the message as being a human or a machine. Publication of the received message can thus only be triggered, for example, if the author of the message is characterized as being a human.

For example, the invention can be implemented, when controlling access to digital content having an audio component, to determine whether a user originating a request for access to digital content is equipped with specific equipment, in this case an audio playback device such as headphones or earphones. Access to digital content can only be triggered, for example, if the user originating the request is actually able to listen to the audio component.

In the remainder of the description, various exemplary implementations of the invention are described.

Figure 1:
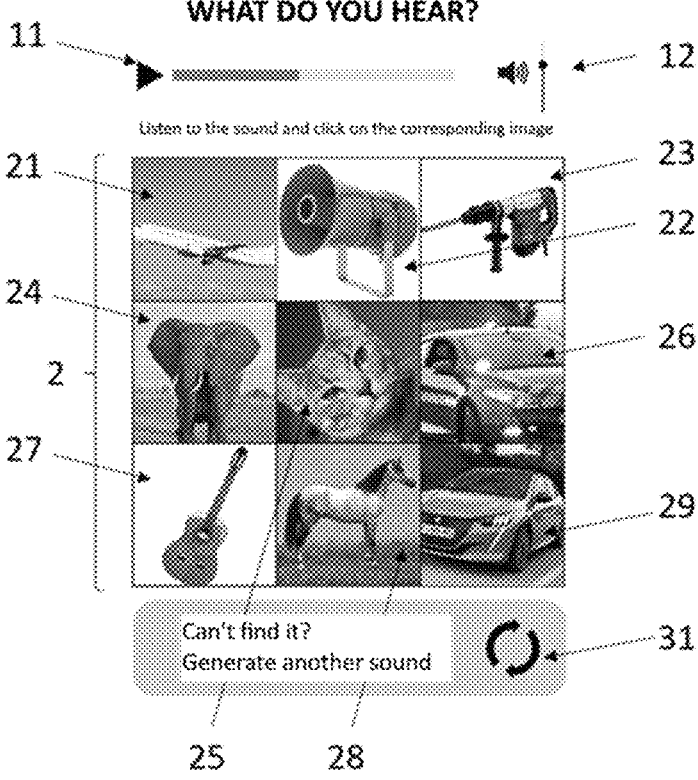
FIG. 1 illustrates an example of a graphical interface within a context of implementing a method for differentiating between a human and a machine.

We now refer to FIG. 1, which illustrates an example of a graphical interface. A graphical interface is a human-machine interface, meaning a device for human-machine dialogue, in which the objects to be manipulated are drawn in the form of icons on a screen, which the user can interact with for example by means of a pointing device such as a mouse or by finger pressure in the case of a touch screen.

In the example presented here, different sections are represented.

An upper section comprises instructions, in textual form, intended for the user, as well as a play button 11 for playing a sound clip comprising a second sound as defined above, and a volume control button 12.

"Sound clip" is understood to mean:

either a clip from a sound recording, possibly subject to computer processing, including unintelligible audio content, or a synthetic sound comprising such audio content.

Various examples of sounds are presented on https://research.google.com/audioset/ontology/index.html, in the form of several classes of sounds, in this case sounds:

linked to the functioning of the human body (voice, breathing, clapping, whistling, heartbeat), or emitted by animals (pets, farm, wild), or emitted by objects (vehicle, engine, doorbell, alarm, tool, explosion, breakage of wood or glass, controlled flow of liquid), or musical (of a specific instrument or musical genre), or from nature (wind, storm, fire, rain, waterfall), or ambient (noise, soundscape), or considered ambiguous because they do not formally fall into a single class among those mentioned above (onomatopoeia, impacts, friction).

The sound clips referred to in the context of the invention are likely to belong to any class of sounds mentioned above, and to any subclass within these classes, but specifically excluding intelligible human voice and the sounds associated with a musical genre, as the desire is to eliminate linguistic and cultural barriers.

In the current case, the first instruction is to listen to the sound clip by interacting with play button 11. Volume adjustment button 12 is provided for optimizing the user's listening comfort. Optionally, an additional button can be provided at the end of listening to allow listening again to the sound clip.

A middle section displays a set 2 of interactive elements, in the current case a set of thumbnails 21-29.

In the example presented here, the thumbnails each represent either an animal having a generally recognizable call or a device having a characteristic operating noise.

A second instruction is to interact with the thumbnail suggestive of the second sound.

For example, if the second sound is neighing, then the user is expected to interact only with the interactive element associated with such a second sound, here the thumbnail representing a horse 28.

On the other hand, if the second sound is the throbbing of an engine, then the user is expected, for example, to interact with the interactive element associated with such a second sound, here the thumbnail representing a car 29. Optionally, other interactions can also be accepted. For example, in this example it is conceivable that a human alternatively interacts with the thumbnail representing a police car 26, or with the one representing a plane 21.

In the example presented here, there are nine thumbnails, distributed in a three-by-three grid.

Such a distribution allows the thumbnails to be easily displayed on different forms of screens, by numerous devices running different platforms.

The number nine is a compromise between:

minimizing the probability that a machine interacting with a randomly chosen thumbnail is incorrectly identified as human, and avoiding the evaluation of a human's short-term memory performance, in addition to the sound recognition.

It is also desirable, again to avoid measuring a human's short-term memory performance, that the thumbnails remain displayed before, during, and after listening to the second sound.

In terms of cognitive psychology, the memory span, which quantifies the number of digits that can be reproduced immediately after hearing them, usually ranges between 5 and 9 depending on the individual. In comparison to such a recall test, a user relies less on memory when it comes to selecting, after listening to a sound clip, an interactive element on the basis of its cognitive content. Therefore, in the present context, displaying nine thumbnails is acceptable.

A lower section proposes resetting the graphical interface by means of a reset button 31, in order to allow listening, if the user wishes, to a new second sound then identifying an interactive element corresponding to this new second sound.

Figure 2:
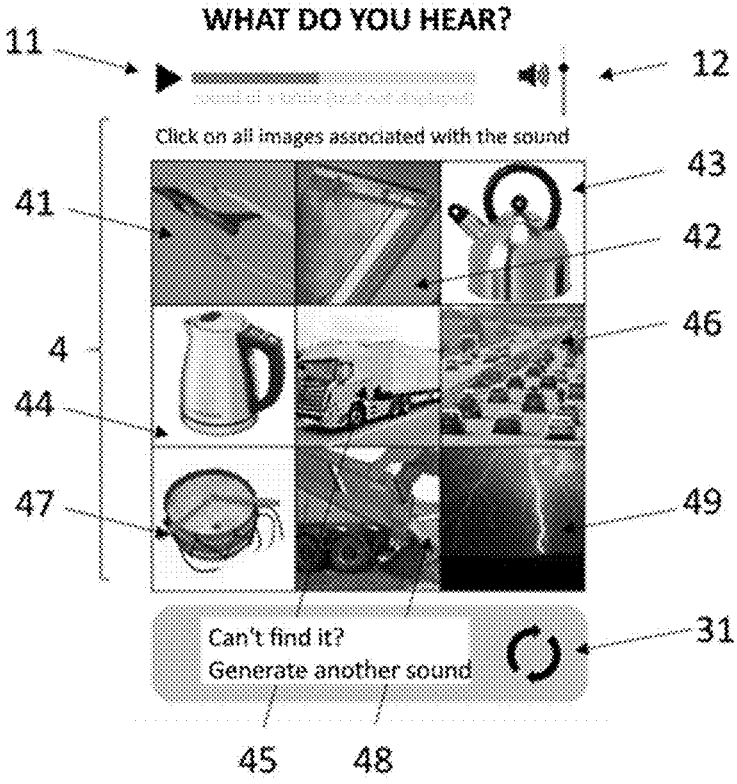
FIG. 2 illustrates a variant of the graphical interface of FIG. 1 in one exemplary embodiment.

We now refer to FIG. 2 which is a variant of FIG. 1, in which the interactive elements also are thumbnails and in which, after listening to a second sound, the user is no longer asked to select the interactive element corresponding to this second sound, but all interactive elements, here all thumbnails corresponding to this second sound, among a set (4) of interactive elements, here thumbnails 41-49.

For example, the second sound can be a clip from a sound recording of a kettle heating water, or a synthetic sound effect reproducing such a sound clip.

It is thus possible to define, within displayed set 4 of thumbnails, a first subset of thumbnails that is formed of thumbnails 43, 44 each representing a kettle, with each of which an interaction by the user is expected. These thumbnails can thus be previously associated, within a lookup table, with the sound clip indicative of a functioning kettle. More generally, one can define within set 4 of interactive elements a first subset of interactive elements respectively associated with a first identifier, thus forming a first subset of identifiers associated with a first sound.

It is also possible to define a second subset of thumbnails, formed of thumbnails with which the user has actually interacted. More generally, it is possible to define within set 4 of interactive elements a second subset of interactive elements respectively associated with a second identifier, thus forming a second subset of identifiers, associated by the user with a second sound when hearing this second sound.

If the second subset of thumbnails comprises all thumbnails of the first subset, then this means that the user has indeed interacted with all thumbnails associated with the sound clip indicative of a functioning kettle.

Among the thumbnails displayed that are not part of the first subset, it is possible that some were previously associated, within a lookup table, with a sound clip that is different from the one indicative of the functioning kettle. For example, thumbnail 49 at the bottom right of the set of thumbnails shown in FIG. 2 can be associated with a sound clip indicative of thunder.

It is also possible that other thumbnails, forming a third subset of thumbnails, were not previously associated in a lookup table with any sound clip.

For example, a secondary objective to the characterization of a user as being suitable or unsuitable, for example differentiation between a human and a machine, can be to identify a given sound clip.

In particular, the sound of rain on a roof window bears a resemblance to the sound of a functioning kettle. To remove doubt about the nature of a given second sound which initially seems to correspond to either of these two possibilities, the user can be presented with both:

two interactive elements, for example two thumbnails 43, 44, as a first subset of thumbnails, each representing a kettle, and an interactive element, for example thumbnail 42, as a third subset of thumbnails, representing a roof window in the rain.

By comparing the second subset formed of the interactive element(s) with which the user has interacted, to the first and third subset, it is possible:

on the one hand, to identify the user as being a human, therefore a suitable user, if the second subset is identical to the first or to the third subset, or as being a machine, therefore an unsuitable user, if the second subset is identical to neither the first nor the third subset, and on the other hand, to identify the sound clip as relating either to the sound of rain on the roof window or to the operation of the kettle, in accordance with the user's interpretation. A lookup table between sound clips and thumbnails can thus be updated to reflect this interpretation.

Figure 3:
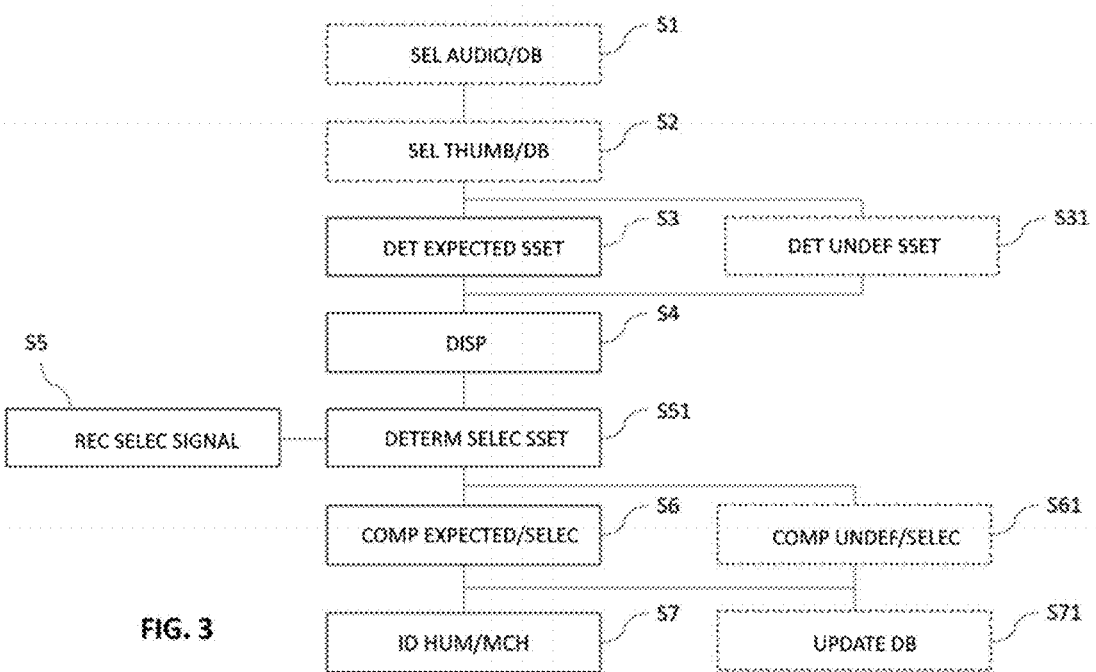
FIG. 3 illustrates a general algorithm of a computer program for implementing a method for differentiating between a human and a machine, in one exemplary embodiment.

We now refer to FIG. 3 which illustrates a general algorithm of a computer program, in relation for example to one or the other of the graphical interfaces of FIGS. 1 and 2, for implementing a method for differentiating between a human and a machine.

When considering a client-server architecture, this computer program can be executed, for example, by one or more processing circuits on the server side, while the interaction with the user takes place on the client side.

In other words, the graphical interface is displayed on a client-side terminal, this terminal able to be for example a smartphone, a laptop or desktop computer, or a set-top box connected to a television, or a network device for providing services and/or digital content. Similarly, still on the client side, the user can interact with the graphical interface by means of for example a touch interface, a remote control, or a pointing device. On the other hand, the computer program described below may be implemented exclusively on the server side, with the aim to prevent attempts to bypass the human-machine differentiation.

A sound clip, as defined above, is selected S1 from a database of sound clips.

Similarly, several interactive elements, here several thumbnails, are selected S2 from a database of interactive elements, here of thumbnails, thus forming a set of interactive elements, here of thumbnails. For example, 4, 6, 8, 9, 12, 15, or 16 initial thumbnails can be selected for simultaneous display respectively in a 2×2, 2×3, 2×4, 3×3, 3×4, 3×5, or 4×4 grid.

One or more additional thumbnails can also be selected for subsequent display, replacing an initial thumbnail which has been the object of an interaction via a human-machine interface.

Selection of the sound clip and selection of the interactive elements are carried out in no particular order. It is only necessary to ensure that:

one or more of the selected interactive elements represent or are associated with an entity that can be unambiguously associated by a human with the selected sound clip, and one or more of the remaining interactive elements represent an entity that can be unambiguously considered by a human as unrelated to the selected sound clip.

This objective can be achieved for example by means of statistical learning. Typically, a same second sound is played for a large number of human users while a same set of thumbnails is simultaneously presented to them. Human users can then be asked to indicate one or more thumbnails corresponding to the sound clip played.

On the basis of the indications received, it is possible for example to associate one or more interactive elements predominantly selected, or one or more thumbnails predominantly selected, or selected by a percentage of suitable users exceeding a certain threshold, for the second sound played. This association can be made by means of a lookup table between the sound clips in the sound clip database and the interactive elements in the interactive elements database.

It is thus possible for example to select a first given sound, as well as one or more interactive elements associated with this first sound and forming the first subset of interactive elements associated with a first set of identifiers, and one or more interactive elements not associated with this first sound.

In addition, it is also possible, for example in the lookup table defined above, to provide for associating one or more interactive elements selected by a minority, or selected by a percentage of suitable users that is less than a certain threshold, with an indication that this interactive element or these interactive elements are unrelated to this first sound.

It is thus possible for example to select a first given sound, as well as one or more interactive elements associated with this first sound and forming the first subset of interactive elements, as well as:

one or more interactive elements associated with an indication that this or these interactive elements are unrelated to this first sound, and/or one or more interactive elements associated neither with this first sound nor with such an indication.

The first subset of interactive elements is then determined S3. The first subset of interactive elements is defined as being formed of the interactive element(s) in the set of interactive elements for which an interaction is expected from a user upon hearing a second sound corresponding to said first sound.

Continuing the previous example involving databases and a lookup table, the first subset of interactive elements designates, in this example, the interactive elements of the selected set of interactive elements which are associated with the selected first sound.

A command is issued to trigger displaying a graphical interface such as, for example, that of FIG. 1 or FIG. 2.

The command thus triggers displaying the set of interactive elements, here the selected set of thumbnails S4, on a display device such as a screen, and can further trigger displaying a play button to allow the selected sound clip to start playing.

The play button is optional; alternatively any other mechanism for triggering playback of the selected sound clip comprising the second sound can be used.

For example, playback of the sound clip and display of the set of thumbnails can be automatically triggered at the same time. Alternatively, playback of the sound clip can be automatically triggered after a predefined time has expired. This allows the user to prepare by taking note of the thumbnails as well as becoming aware that a sound clip will be played.

The user is asked to select, from the displayed set of thumbnails, a thumbnail, or alternatively several thumbnails, corresponding to the selected sound clip.

Once the selected sound clip has been played, or during playback of the selected sound clip, the displayed thumbnails can become interactive so that the user can interact, by means of a human-machine interface such as the one described above, with one or more of these thumbnails.

Alternatively, it may be provided that the displayed thumbnails are interactive even before the selected sound clip is played, and that any interaction with a displayed thumbnail occurring before the selected sound clip is played results in issuing an error message, or is interpreted as a clue in support of identifying the user as a machine.

The user is considered to have interacted, as indicated to him, with at least one thumbnail in the set of thumbnails.

As a result, a selection signal or several selection signals indicating user interaction by means of a human-machine interface with one or more thumbnails in the set of thumbnails is received S5. For example, such a selection signal can be sent to the server side for interpretation. This second selection signal comprises one or more second identifiers.

Based on the selection signal or selection signals received, a second subset of thumbnails is determined S51. This second subset of thumbnails is formed of the thumbnail or thumbnails with which the user actually interacted.

We therefore have at this stage:

a first subset of thumbnails, formed exclusively of the thumbnail(s) with which a human user was expected to interact because these thumbnails are associated with the selected sound clip, and a second subset of thumbnails, formed exclusively of the thumbnail(s) with which the user actually interacted during or after playback of the selected sound clip.

This translates into:

a first subset of first identifiers of a first sound, and at least a second identifier received from a human-machine interface, when a second sound is heard by a user of the human-machine interface.

This first subset of first identifiers and this or these second identifiers are then compared S6 for the purpose of identifying S7 the user as being suitable or unsuitable, based on predefined rules.

The comparison may return several types of results.

For example, the result of the comparison may indicate that the first and the second subset of thumbnails are identical. This means that the user has correctly identified all thumbnails the user was asked to associate with the selected sound clip. An example of a predefined rule could specify that when the comparison returns such a result, then the user is identified as human.

For example, the result of the comparison may indicate that the first and second subset of thumbnails have no elements in common. This means that the user has indeed interacted with one or more tiles, but has not correctly identified any of the tiles that the user was asked to associate with the selected sound clip. An example of a predefined rule could specify that when the comparison returns such a result, then the user is identified as a machine.

Other cases are possible, besides these binary examples. One possible example of a predefined rule is to identify the user as a machine when the first and second subset of thumbnails are not strictly identical.

Alternatively, additional rules can be predefined to take into account certain cases where the first and second subsets of thumbnails partly overlap.

For example, the result of the comparison may indicate that the first subset of thumbnails includes all the thumbnails of the second subset of thumbnails, as well as one or more additional thumbnails. The user therefore correctly selected only some of the thumbnails that the user was expected to associate with the selected sound clip, and did not select any other thumbnails.

In such a situation, one predefined rule may for example require directly ending the human-machine differentiation, identifying the user as human, in order to pursue a general ergonomic objective.

Alternatively, if the main objective is to prevent, as much as possible, a machine from being incorrectly identified as being a human, a predefined rule may for example provide for:

triggering a new iteration of the algorithm while selecting a new sound clip and a new set of thumbnails, or implementing, in addition, another form of Turing test in order to identify the user definitively as being a human or as being a machine.

The algorithm described above can optionally make it possible not only to identify a user as being a human or a machine, but also to enrich a database associating sound clips with thumbnails each representing an entity that is a source of such a sound clip. Such a database can, for example, be used later downstream to perform sound recognition from recordings.

For example, if the user is identified as being a human, then it is possible to trigger a new iteration of the algorithm while selecting a new sound clip and a new set of thumbnails.

In this new iteration, it is still necessary to ensure:

that one or more of the selected thumbnails represent an entity that can be unambiguously associated by a human with the selected sound clip, and that one or more of the remaining thumbnails represent an entity that can be unambiguously considered by a human as unrelated to the selected sound clip.

Furthermore, in this new iteration, also provided among the selected thumbnails are one or more thumbnails representing an entity whose relationship with the selected sound clip is undefined and potentially ambiguous for a human.

Consider for example a selected sound clip coming from a database of sound clips and corresponding to the noise of a lawnmower engine.

This selected sound clip can be associated, in a lookup table, with a first group of thumbnails coming from a thumbnail database and representing lawnmowers.

It is also possible to define, in this thumbnail database, a second group of thumbnails representing animals, musical instruments, or other entities not likely to emit a sound resembling the noise of a lawnmower engine. The thumbnails of this second group of thumbnails can be associated, in the lookup table, with an indication that they are unrelated to the selected sound clip.

Finally, it is also possible to define, in this thumbnail database, a third group of thumbnails representing another device equipped with a motor, for example a moped, and therefore capable of emitting a sound similar to that of a lawnmower engine.

In this new iteration, the selection of the set of thumbnails can thus allow for selecting one or more thumbnails from each of the three groups of thumbnails defined above.

The set of thumbnails thus comprises:

a first subset of thumbnails formed of the thumbnails selected from the first group of thumbnails (here thumbnails representing a lawnmower), another subset of thumbnails formed of thumbnails selected from the second group of thumbnails (here thumbnails representing various entities, for example animals or musical instruments), and a third subset of thumbnails formed of the thumbnails selected from the third group of thumbnails (here thumbnails representing mopeds).

This third subset of thumbnails is determined S31 as designating a subset of thumbnails whose relationship to the selected sound clip is undefined at the time of their selection.

The interaction with the user is the same as during the previous iteration of the algorithm.

The selected set of thumbnails is displayed, the selected sound clip is played, then at least one selection signal is received.

This signal comes from a human-machine interface and is indicative of a selection of one or more thumbnails from the displayed set of thumbnails.

After identifying, on the basis of this selection signal received, a second subset formed of each selected thumbnail, it is possible to make a comparison S61 between the third subset of thumbnails and the second subset of thumbnails. In this example, it is therefore determined whether or not the thumbnails selected by the user represent mopeds.

For each thumbnail (here representing a moped) for which the relationship with the selected sound clip is initially uncertain, this makes it possible to determine whether or not the user, identified as being a human, considers this thumbnail as representing an entity capable of emitting a noise corresponding to such a sound clip.

If the result of such a comparison S61 indicates that the second subset of thumbnails (those selected) comprises all thumbnails of the third subset of thumbnails (those representing a moped), then it can be provided to associate S71 the selected sound clip with the thumbnails of the third subset. In addition, it is also possible to perform a comparison S6 between the first subset of thumbnails (here those representing a lawnmower) and the second subset of thumbnails. If the result of such a comparison S6 indicates that the second subset of thumbnails does not include any thumbnails in the first subset of thumbnails (in this example, representing a lawnmower), then this means that the selected sound clip was incorrectly associated with the thumbnails in the first subset of thumbnails. Therefore, it can be provided in such case to update a pre-existing lookup table between sound clips and thumbnails. Such an update consists, for example, of no longer associating the selected sound clip with the first subset of thumbnails (here those representing a lawnmower), but instead with the third subset of thumbnails (here those representing a moped).

Figure 4:
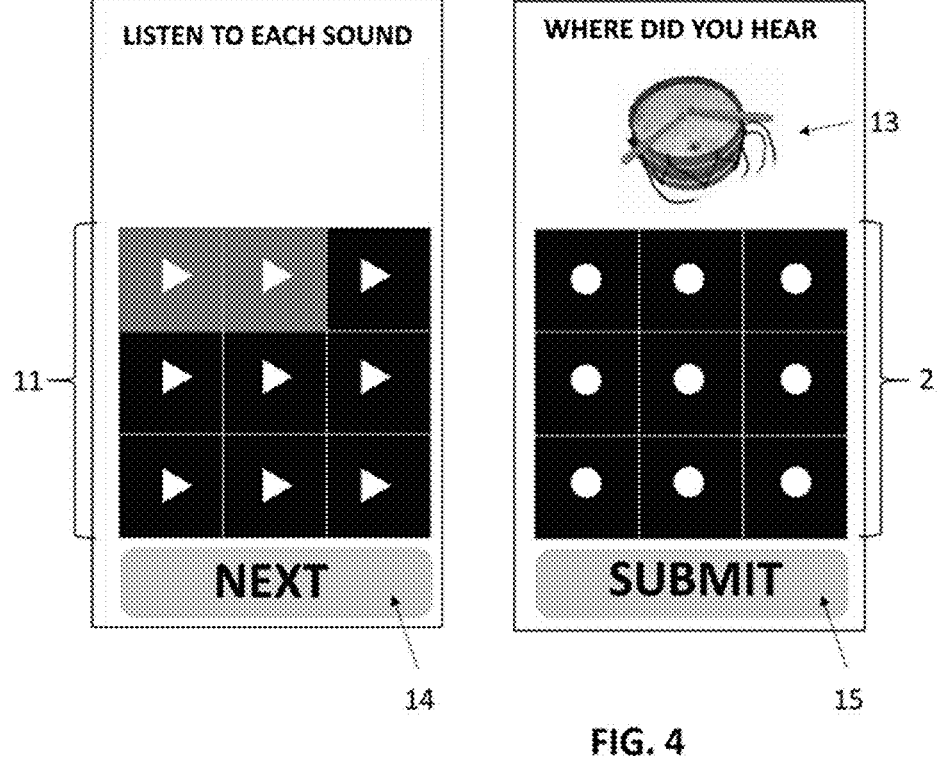
FIG. 4 illustrates another variant of the graphical interface of FIG. 1, in one exemplary embodiment.

We now refer to FIG. 4, which shows an example variant of the graphical interfaces of FIGS. 1 and 2.

In this example, a plurality of play buttons 11 are displayed, here nine play buttons distributed in the form of a 3×3 grid.

When a user interacts with one of these play buttons, a sound clip associated with it is played. At the same time, the play button currently being interacted with may become animated, for example emphasized.

Once the user has interacted with all the play buttons, the user can interact with a "Next" button 14 to trigger animation of the graphical interface.

A set 2 of thumbnails is then superimposed on play buttons 11. In other words, each play button is replaced with a corresponding thumbnail.

Simultaneously, an image 13 representing an entity likely to have generated one of the sound clips that was played to the user is displayed. Image 13 is associated with the sound clip in question.

The user is then asked to indicate the sound clip, among those having been played, likely to have been emitted by the entity represented in image 13. To do this, the user is expected to interact with the thumbnail which is located at the same location as the play button that triggered the sound clip in question, then, optionally, to confirm this choice by interacting with a confirmation button 15.

Figure 5:
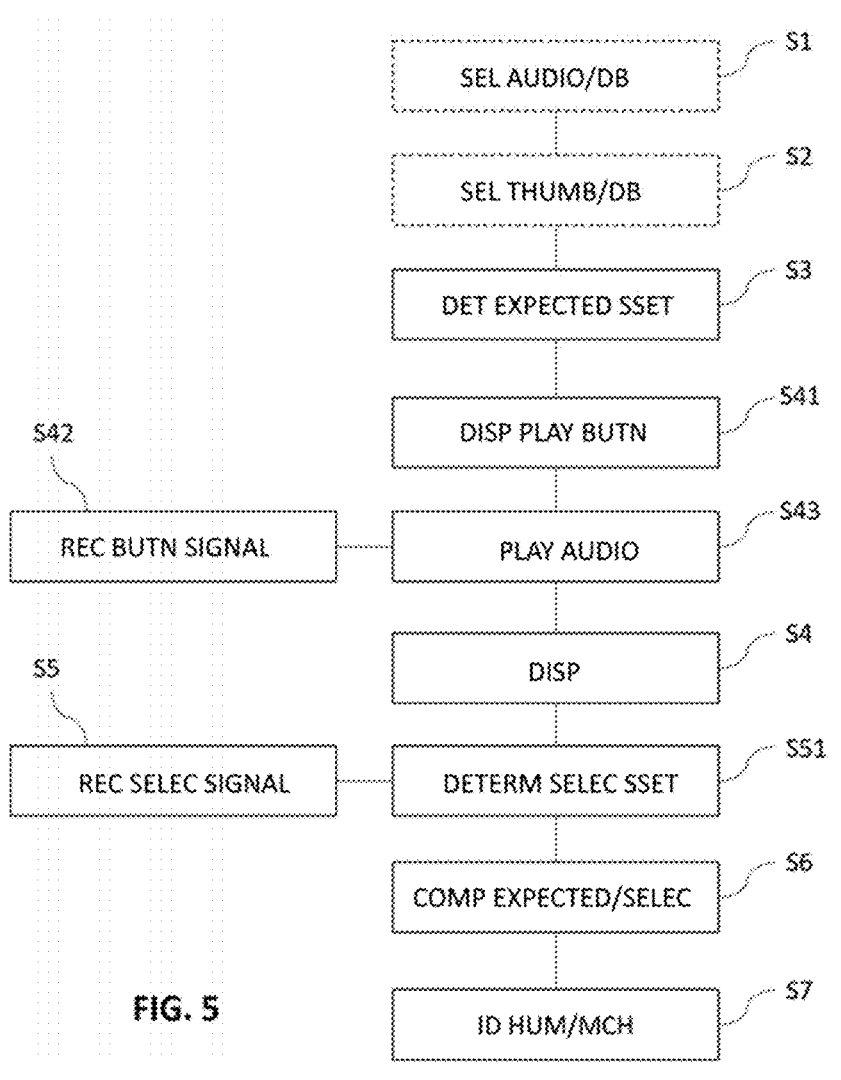
FIG. 5 illustrates a variant of the algorithm of FIG. 3, in one exemplary embodiment.

We now refer to FIG. 5 which illustrates an example of a variant of the algorithm illustrated in FIG. 3, this variant being linked for example to the graphical interface shown in FIG. 4.

The algorithm illustrated in FIG. 5 includes all the essential elements of the one illustrated in FIG. 3, which are described again below, and can also integrate any of the optional elements shown in FIG. 3.

Several sound clips are selected S1, for example in a database of sound clips.

An image associated with one of the selected sound clips and representing an entity capable of having emitted or capable of emitting this selected sound clip is also selected S2, for example in a database of images.

A subset of sound clips is determined S3; it is defined as designating the sound clip associated with the selected image.

Several play buttons are displayed simultaneously S41. These buttons are interactive and respectively associated with one of the selected sound clips. A user can therefore interact successively with each play button and thus listen successively to each of the selected sound clips.

In concrete terms, following the user's interaction with a play button, a signal indicating this interaction is received S42 and triggers S43 playback of the sound clip associated with this play button.

Once all the selected sound clips have been played, it is possible to trigger a routine to animate the graphical interface, in order to display S4 a set of thumbnails superimposed on the play buttons, as well as the selected image.

Among the thumbnails in the set of thumbnails, a first subset of thumbnails can be defined as consisting of the thumbnail superimposed on the play button having triggered the sound clip associated with the selected image.

For example, if the selected image represents a cat and if the interaction with the play button located at the top left of a 3×3 grid of play buttons triggered the playing of a sound clip associated with the selected image and corresponding to meowing, then the first subset of thumbnails is formed of the thumbnail located at the top left of a 3×3 grid of thumbnails.

The user is then asked to indicate the sound clip among those played as likely to be emitted by the entity represented in the selected image.

To do this, the user is asked to interact specifically with the thumbnail having the same position as the play button that triggered the sound clip associated with the selected image.

Following the user's interaction with a thumbnail, a signal indicating this interaction is received S5 and on the basis of this signal, a second subset of thumbnails is determined S51. The second subset of thumbnails is formed of the thumbnail with which the user actually interacted.

Next, a comparison test S6 between the first subset of thumbnails and the second subset of thumbnails can be conducted, and on the basis of the result of this test, the user is identified S7 as either a human or a machine.

Of course, the algorithm shown in FIG. 5 can alternatively, in an additional variant, require:

identifying several sound clips associated with a same selected image, or identifying all sound clips associated with any one of the images in a list of selected images, or identifying one or more sound clips not associated with a selected image.

Figure 6:
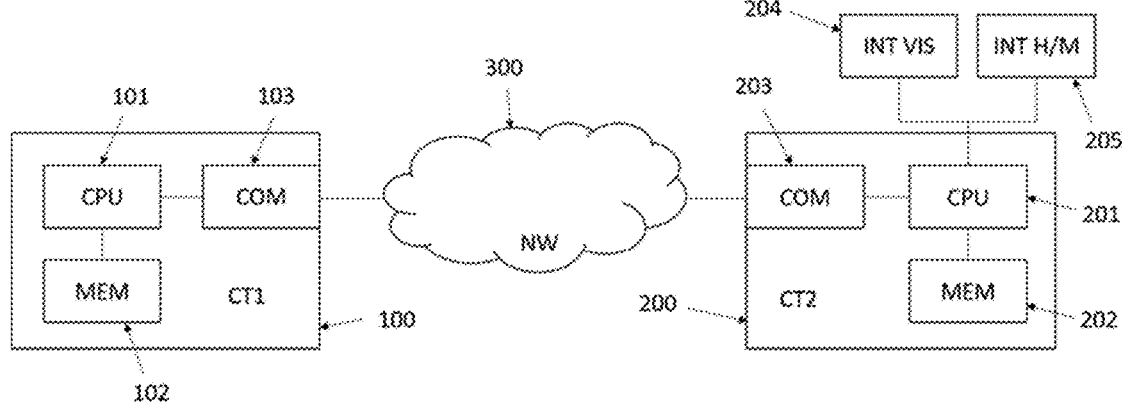
FIG. 6 illustrates a system for implementing a method for differentiating between a human and a machine, in one exemplary embodiment.

We now refer to FIG. 6, which shows an example of a system capable of implementing any of the algorithms described above.

The system comprises a first processing circuit 100 and a second processing circuit 200 which are connected through a network 300, for example the Internet or a local area network.

The first processing circuit comprises at least one processor 101 connected to a memory 102 and to a network communication interface 103.

First processing circuit 100 may for example be integrated into a desktop or laptop computer, a network gateway, a computer server, or more generally, any computing or network device.

Second processing circuit 200 also comprises at least one processor 201 connected to a memory 202 and to at least one communication interface 203, in particular a network communication interface, thus enabling communication with first processing circuit 100 via network 300.

Second processing circuit 200 designates a network device such as a set-top box or a terminal such as a smartphone and is intended to be used to provide a service to one or more users.

Second processing circuit 200 is also connected to a visual playback device 204 such as a screen or a video projector in order to display a graphical interface, a sound playback device such as a speaker which optionally can be integrated into the visual playback device, and a human-machine interface 205, for example a voice or touch interface, through which a user can interact with the displayed graphical interface.

Figure 7:
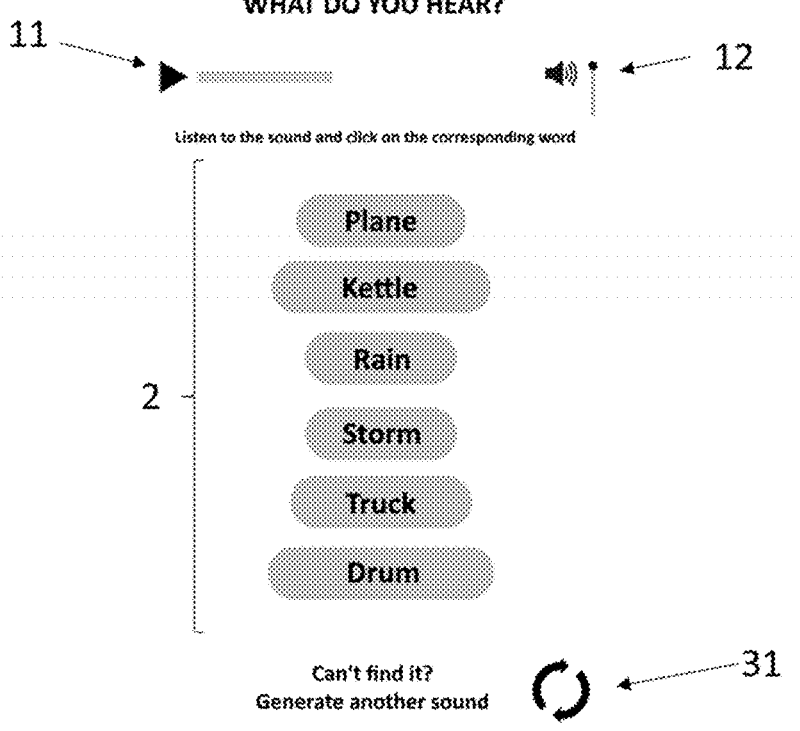
FIG. 7 illustrates another variant of the graphical interface of FIG. 1, in one exemplary embodiment.

We now refer to FIG. 7, which illustrates yet another example of a variant of the graphical interfaces represented in FIGS. 1, 2, and 4.

As in FIGS. 1, 2, and 4, the graphical interface of FIG. 7 comprises a button 11 for controlling the playback of a second sound, a series 2 of elements which are interactive when listening to the second sound, and a reset button 31.

Series 2 of interactive elements in FIG. 7 differs from the one in FIGS. 1 and 2 in that it has no thumbnails but displays a selection of words.

Thus, when the user hears a second sound, the user interacts with the graphical interface by means of a human-machine interface by selecting one of the words displayed, thus generating a second identifier.

The graphical interface shown in FIG. 7 satisfies the need to determine whether or not a user is equipped with a certain specific type of device.

It may be provided for example that the user is considered to be a suitable user as long as the user is equipped with a sound playback device which allows playing the second sound.

Thus, it is sufficient to allow the user to:

control playback of the second sound, for example by means of the related control button 11, then characterize this second sound by an interaction with one or more interactive elements in series 2 of interactive elements.

From this perspective, the nature of series 2 of interactive elements therefore does not matter as long as:

these elements are respectively associated with a first identifier associated with a first sound, and interacting with one of these interactive elements generates a second identifier.

It is therefore by no means necessary for the interactive elements to be thumbnails in particular.

Alternatively, it may be provided for example that the user is considered to be a suitable user as long as the user is equipped with a sound sensor which allows capturing the second sound.

Thus, it is sufficient to allow the user to, when hearing the second sound:

trigger the capture of this second sound, for example by means of a control button, and characterize this second sound by an interaction with one or more interactive elements in series 2 of interactive elements.

These two steps do not need to be implemented in any particular order.

The second sound can then be compared to a database of first sounds in order to identify a first sound having a resemblance to the second sound.

At least one second identifier, resulting from the user's interaction characterizing this second sound, can then be compared to a first subset of first identifiers that is associated with the first sound thus identified, in order to characterize, according to a predefined rule, the user as being a suitable or unsuitable user.

For example, the result of this last comparison can allow identifying identify the user as being equipped with a sound sensor, and therefore determining that the user is a suitable user.

Although the present disclosure has been described with reference to one or more examples, workers skilled in the art will recognize that changes may be made in form and detail without departing from the scope of the disclosure and/or the appended claims.

The invention claimed is:

1. A method for characterizing a user, the method being implemented by a processing device, the method comprising:

comparing between at least one first identifier of at least one first sound and at least one second identifier received from a human-machine interface, the at least one second identifier being received after the human-machine interface plays a list of a plurality of second sounds, which are heard by the user, the at least one second identifier corresponding to a selected one of the second sounds, the comparing triggering, in response to the received at least one second identifier corresponding to the at least one first identifier, a characterization of the user as being a suitable user based on a capability of the user to correctly recognize the selected one of the second sounds from among the plurality of second sounds played by the human-machine interface.

2. The method according to claim 1, wherein the method comprises:

receiving at least one signal originating from the human-machine interface after the human-machine interface plays the plurality of second sounds, the signal comprising the at least one second identifier, and wherein the at least one second identifier corresponds to at least one second sound of the plurality of second sounds heard by the user.

3. The method according to claim 1, wherein for each of the at least one first sounds, the at least one identifier forms a first subset, and wherein the method comprises one of the following steps:

issuing a command to play a sound clip comprising the first sound associated with one of the first identifiers of the at least one first sound, a corresponding one of the at least one second sound heard comprising the first sound played;

issuing a command to capture at least one second sound of the plurality of second sounds heard by the user, the capture triggering a comparison of the second sound heard and captured with at least one of the at least one first sound associated with the first subset of identifiers.

4. The method according to claim 1, wherein for each of the at least one first sound, the at least one identifier forms a first subset and wherein the method comprises:

issuing a command to display a set of thumbnails, the displayed set of thumbnails comprising at least one identifier of the first subset for at least one of the first sounds and which is associated with at least one second sound of the plurality of second sounds heard by the user.

5. The method according to claim 1, wherein the method comprises:

receiving at least one signal originating from the human-machine interface, upon the user of the human-machine interface hearing the plurality of second sounds, the at least one signal comprising the at least one second identifier, on the basis of the received at least one signal, generating a second subset comprising the at least one second identifier, the comparison being made between at least one first subset of the at least one first identifier of the at least one first sound and at least one second identifier of the second subset, the comparison triggering, in response to the at least one second identifier or all the second identifiers of the second subset received belonging to the first subset associated with the at least one first sound corresponding to at least one second sound of the plurality of second sounds heard by the user, the characterization of the user as being a suitable user.

6. The method according to claim 1, wherein the at least one first identifier and the at least one second identifier have an identifier type among the following:

at least one word, at least one image, a label associated with an object;

a thumbnail.

7. The method according to claim 1, wherein:

at least one second sound of the plurality of second sounds heard by the user is a sound produced by a given element, and each first identifier of the at least one first identifier associated with the at least one first sound that corresponds to the second sound which is the sound produced by the given element represents the given element.

8. The method according to claim 1, comprising selecting at least one second sound of the plurality of second sounds in a database of sound clips on the basis of a lookup table associating a respective class with each sound clip in the database.

9. The method according to claim 8, wherein for each of the at least one first sound, the at least one identifier forms a first subset and wherein the method comprises:

issuing a command to display a set of thumbnails, the displayed set of thumbnails comprising at least one identifier of the first subset for at least one of the first sounds and which is associated with at least one second sound of the plurality of second sounds heard by the user, the set of thumbnails further comprising a third subset formed of at least one thumbnail;

performing a comparison test between the third subset and a second subset comprising the at least one second identifier, and on the basis of the comparison test, updating, in the lookup table associating a respective class with each sound clip in the sound clip database, the class associated with the selected sound clip.

10. The method according to claim 8, wherein for each of the at least one first sound, the at least one identifier forms a first subset and wherein the method comprises:

issuing a command to display a set of thumbnails, the displayed set of thumbnails comprising at least one identifier of the first subset for at least one of the first sounds and which is associated with at least one second sound of the plurality of second sounds heard by the user, the set of thumbnails further comprising a third subset formed of at least one thumbnail;

performing a comparison test between the third subset and a second subset comprising the at least one second identifier, and on the basis of the comparison test, updating, in the lookup table associating a respective class with each thumbnail in the thumbnail database, the class associated with at least one thumbnail in the third subset.

11. The method according to claim 1, comprising selecting at least one first subset of first identifiers in a database of first identifiers, on the basis of a lookup table associating a respective class with each first identifier in the database.

12. The method according to claim 11, comprising selecting at least one second sound of the plurality of second sounds in a database of sound clips on the basis of a lookup table associating a respective class with each sound clip in the database, wherein the selection of said at least one first subset of first identifiers in the database of first identifiers is further based on the class associated with the sound clip selected as at least one second sound.

13. The method according to claim 1, wherein each of the at least one second identifier corresponds to a selected one of the second sounds.

14. The method according to claim 1, further comprising:

receiving the at least one second identifier from the human-machine interface, which corresponds to the selected one of the plurality of second sounds, recognized by the user, following playback of the plurality of second sounds by the human-machine interface.

15. The method according to claim 1, further comprising:

following playback of the list of a plurality of second sounds by the human-machine interface, triggering reproduction of an indicator of an entity likely to have generated at least one of the plurality of second sounds;

after triggering the reproduction, receiving the at least one second identifier from the human-machine interface corresponding to the one of the second sounds selected by the user as corresponding to the indicator of the entity; and after receiving the at least one second identifier, performing the comparing.

16. A non-transitory computer-readable storage medium on which is stored a program for implementing a method for characterizing a user when this program is executed by a processor, wherein the method comprises:

comparing between at least one first identifier of at least one first sound and at least one second identifier received from a human-machine interface, the at least one second identifier being received after the human-machine interface plays a list of a plurality of second sounds which are heard by the user, the at least one second identifier corresponding to a selected one of the second sounds, the comparing triggering, in response to the received at least one second identifier corresponding to the at least one first identifier, a characterization of the user as being a suitable user based on a capability of the user to correctly recognize the selected one of the second sounds from among the plurality of second sounds played by the human-machine interface.

17. A processing device able to perform processing to characterize a user at command of a human-machine interface, wherein the processing device comprises:

a processor; and a non-transitory computer readable medium comprising instructions stored thereon which when executed by the processor configure the processing device to:

compare at least one first identifier of at least one first sound and at least one second identifier received from a human-machine interface, the at least one second identifier being received after the human-machine interface plays a list of a plurality of second sounds which are heard by the user, the at least one second identifier corresponding to a selected one of the second sounds, the comparator triggering, in response to the received at least one second identifier corresponding to the at least one first identifier, characterizing the user as being a suitable user based on a capability of the user to correctly recognize the selected one of the second sounds from among the plurality of second sounds played by the human-machine interface.

\*   \*   \*   \*   \*